United States Patent
Dasgupta et al.

(10) Patent No.: US 10,437,586 B2
(45) Date of Patent: Oct. 8, 2019

(54) METHOD AND SYSTEM FOR DYNAMIC IMPACT ANALYSIS OF CHANGES TO FUNCTIONAL COMPONENTS OF COMPUTER APPLICATION

(71) Applicant: Infosys Limited, Bangalore (IN)

(72) Inventors: Sudipto Shankar Dasgupta, Bangalore (IN); Swaminathan Natarajan, Bangalore (IN); Arulkumar Gopalan, Namakkal (IN)

(73) Assignee: Infosys Limited, Bangalore (IN)

( * ) Notice: Subject to any disclaimer, the term of this patent is extended or adjusted under 35 U.S.C. 154(b) by 128 days.

(21) Appl. No.: 15/823,228

(22) Filed: Nov. 27, 2017

(65) Prior Publication Data
US 2018/0189055 A1  Jul. 5, 2018

(30) Foreign Application Priority Data

Jan. 3, 2017 (IN) .............................. 201741000247

(51) Int. Cl.
| | |
|---|---|
| *G06F 8/71* | (2018.01) |
| *G06F 11/36* | (2006.01) |
| *G06F 8/41* | (2018.01) |
| *G06F 8/65* | (2018.01) |
| *G06F 8/10* | (2018.01) |
| *G06N 20/00* | (2019.01) |

(52) U.S. Cl.
CPC .................. *G06F 8/71* (2013.01); *G06F 8/10* (2013.01); *G06F 8/433* (2013.01); *G06F 8/65* (2013.01); *G06F 11/3604* (2013.01); *G06F 11/3608* (2013.01); *G06F 11/3692* (2013.01); *G06N 20/00* (2019.01)

(58) Field of Classification Search
CPC ... G06F 8/71; G06F 8/10; G06F 8/433; G06F 8/65; G06F 11/3604; G06F 11/3608; G06F 11/3692; G06N 20/00
USPC ...................................................... 717/121
See application file for complete search history.

(56) References Cited

U.S. PATENT DOCUMENTS

| | | | |
|---|---|---|---|
| 10,210,530 B1 * | 2/2019 | Peters ..................... | G06Q 30/02 |
| 2003/0115353 A1 * | 6/2003 | Deryugin ............... | G06Q 10/06 709/231 |

(Continued)

OTHER PUBLICATIONS

Law et al., "Incremental Dynamic Impact Analysis for Evolving Software Systems", publish in 2003, IEEE.*

*Primary Examiner* — Emerson C Puente
*Assistant Examiner* — Sen Thong Chen
(74) *Attorney, Agent, or Firm* — Klarquist Sparkman, LLP

(57) ABSTRACT

A method and system support dynamic impact analysis of at least one change to at least one functional component of a computer application comprising tracking a historical record of the at least one change, grouping a release dataset and a build dataset for matching with at least one requirement from a requirement data file, generating a plurality of impact records datasets (410) and identifying a nature of change. Further, a plurality of build specific data sets (216) can be generated based on a text corpus (416) related to the at least one change and classifying at least one description based on the nature of change. Further an impact matrix (426) is generated for predicting a potential impact to the at least one test case based on the at least one of a probability of change or a probability of failure.

23 Claims, 9 Drawing Sheets

(56) References Cited

U.S. PATENT DOCUMENTS

| | | | | |
|---|---|---|---|---|
| 2005/0166094 A1* | 7/2005 | Blackwell | ............ | G06F 11/3664 |
| | | | | 714/38.14 |
| 2007/0061191 A1* | 3/2007 | Mehrotra | ............... | G06Q 10/06 |
| | | | | 705/7.36 |
| 2007/0240116 A1* | 10/2007 | Bangel | ................ | G06F 11/3664 |
| | | | | 717/124 |
| 2011/0246834 A1* | 10/2011 | Rajashekara | ....... | G06F 11/3676 |
| | | | | 714/38.1 |
| 2013/0346956 A1* | 12/2013 | Green | ....................... | G06F 8/65 |
| | | | | 717/168 |
| 2014/0078545 A1* | 3/2014 | Hasegawa | ............. | G06F 3/1205 |
| | | | | 358/1.15 |
| 2015/0142764 A1* | 5/2015 | Burgmeier | .............. | G06F 16/93 |
| | | | | 707/694 |
| 2016/0062721 A1* | 3/2016 | Marcos | ..................... | G06F 8/61 |
| | | | | 345/2.3 |
| 2016/0202970 A1* | 7/2016 | Das | ........................... | G06F 8/74 |
| | | | | 717/123 |
| 2016/0283406 A1* | 9/2016 | Linga | ...................... | G06F 16/93 |
| 2016/0378648 A1* | 12/2016 | Ekambaram | ........ | G06F 11/3616 |
| | | | | 714/38.1 |
| 2017/0024310 A1* | 1/2017 | Andrejko | ............ | G06F 11/3672 |
| 2017/0372247 A1* | 12/2017 | Tauber | ....................... | G06F 8/71 |
| 2019/0087311 A1* | 3/2019 | Donaldson | .......... | G06F 11/3684 |

\* cited by examiner

METHOD AND SYSTEM FOR DYNAMIC IMPACT ANALYSIS OF CHANGES TO FUNCTIONAL COMPONENTS OF COMPUTER APPLICATION

FIELD

The field generally relates to a software development environment, and more particularly to a method and a system for dynamic impact analysis of changes to functional components of a computer application for predicting a potential impact to test cases.

BACKGROUND

Impact analysis is an important step in the software development cycle. Impact analysis is done to identify software artifacts such as requirement, design, class and test artifacts that are potentially affected by a change. Such a change may be in the form of addition, removal or modification of the software artifacts. The change impact analysis helps identify potential consequences of the change or estimating what needs to be modified to accomplish the change. The impact analysis identifies the test cases that should be re-executed to ensure that the change was implemented correctly.

The code change in one function point may have deterministic impact on a different function point; it may be evaluated through function point call stack dependencies. Existing tools use a static code analysis and a dynamic code analysis to identify the changes. But there are situations where the change in the one function point may impact a disconnected function point, due to dynamic calls or due to usage of the same runtime entities. The impact analysis using the static code analysis or the runtime stack analysis may not be sufficient in such situations. However, the static code and the dynamic code analysis restrict identification of the impacted changes based on analysis of syntax and/or call graphs. The test cases are primarily developed to ensure that the core functional components are always within the defined specifications, in order to identify the impacts to the test cases; there is a need for an improved method compared to the existing static code analysis or the call graph analysis.

The impact analysis becomes more difficult to the software developer, if the size of the applications or the functional components are huge, if the applications or the components change from one organization to another, and if there is a lot turnover in the developers responsible for the management of the applications or the components.

As the applications and/or the functional components age and the developers change, there is a possibility that the test cases may go out-of-sync with the functionality; then the knowledge to derive impacts may be lost. Hence, there is a need for the software developers to identify the set of artifacts that belongs to the category of unit test cases, integration tests, build scripts etc., impacted by the code changes in the functional components and/or the applications. Therefore, there is a need to predict impacted test cases that need to be changed whenever there is a change in the functional components of the computer application.

SUMMARY

In one aspect, a method for dynamic impact analysis of at least one change to at least one functional component of a computer application comprising tracking a historical record of the at least one change to the at least one functional component, grouping a release dataset from a software configuration management (SCM) server and a build dataset from a continuous Integration (CI) server and matching with at least one requirement from a requirement data file. A data processor generates a plurality of impact records datasets to identify the at least one change to at least one test case. The data processor analyses the plurality of impact records datasets to determine at least one nature of change to the at least one functional component. A text corpus is generated based on the at least one change from the historical record. The text corpus generated is received by the change classifier to classify at least one description based on the at least one nature of change. The plurality of impact records may be augmented with the at least one nature of change to generate a plurality of build specific datasets. An impact matrix is generated by the data processor based on the plurality of build specific datasets. A probability engine generates an output matrix based on the impact matrix and a dynamic impact analyzer predicts a potential impact to the at least one test case based on the at least one of the impact matrix and output matrix.

In another aspect, a system for dynamic impact analysis of at least one change to at least one functional component of a computer application comprising an instrumentation engine tracking a historical record of the at least one change to the at least one functional component. A data processor comprising grouping a release dataset from a software configuration management (SCM) server and a build dataset from a continuous Integration server (CI) and matching with at least one requirement from a requirement data file. A plurality of impact records datasets may be generated by the data processor to identify the at least one change to at least one test case. The data processor analyzes the plurality of impact records datasets to determine at least one nature of change to at least one functional component. A text corpus is generated based on the at least one change from the historic record. The text corpus is received by a change classifier to classify at least one description based on the at least one nature of change. The plurality of impact records may be augmented with the at least one nature of change to generate a plurality of build specific datasets. An impact matrix is generated based on the plurality of build specific datasets. A probability engine generates an output matrix based on the impact matrix and a dynamic impact analyzer predicts a potential impacts to the at least one test case based on the at least one of the impact matrix and the output matrix.

The methods and systems disclosed herein may be implemented in any means for achieving various aspects, and may be implemented in a form of a machine-readable medium (e.g., non-transitory computer-readable medium or the like) embodying a set of instructions that, when executed by a machine (e.g., computing device), cause the machine to perform any of the operations disclosed herein. Other features will be apparent from the accompanying drawings and from the detailed description that follows.

BRIEF DESCRIPTION OF THE DRAWINGS

Features, aspects, and advantages of the present invention will be better understood when the following detailed description is read with reference to the accompanying drawings, wherein.

DETAILED DESCRIPTION

The embodiments disclosed herein relate to a method and system for dynamic impact analysis of a changes to a functional components of a computer application. In view of the problems discussed above, various embodiments are proposed for the purpose of providing a solution which helps in predicting an impacted test cases whenever there is a change in the functional component of the computer application. The preferable embodiments will be described in more details with reference to the accompanying drawings, in which the preferable embodiments of the present disclosure have been illustrated.

While the particular embodiments described herein may illustrate the invention in a particular domain, the broad principles behind these embodiments could be applied in other fields of endeavor. To facilitate a clear understanding of the present disclosure, illustrative examples are provided herein which describe certain aspects of the disclosure. However, it is to be appreciated that these illustrations are not meant to limit the scope of the disclosure and are provided herein to illustrate certain concepts associated with the disclosure.

The following description is full and informative description of the best method and system presently contemplated for carrying out the present disclosure which is known to the inventors at the time of filing the patent application. Of course, many modifications and adaptations will be apparent to those skilled in the relevant arts in view of the following description in view of the accompanying drawings and the appended claims. While the systems and methods described herein are provided with a certain degree of specificity, the present disclosure may be implemented with either greater or lesser specificity, depending on the needs of the user. Further, some of the features of the present disclosure may be used to advantage without the corresponding use of other features described in the following paragraphs.

It is also to be understood that the present disclosure may be implemented in various forms of hardware, software, firmware, special purpose processors, or a combination thereof. Preferably, the present disclosure is implemented in software as a program tangibly embodied on a program storage device. The program may be uploaded to, and executed by, a machine comprising any suitable architecture. One or more of the above-described techniques may be implemented in or involve one or more computer systems.

Figure 1:
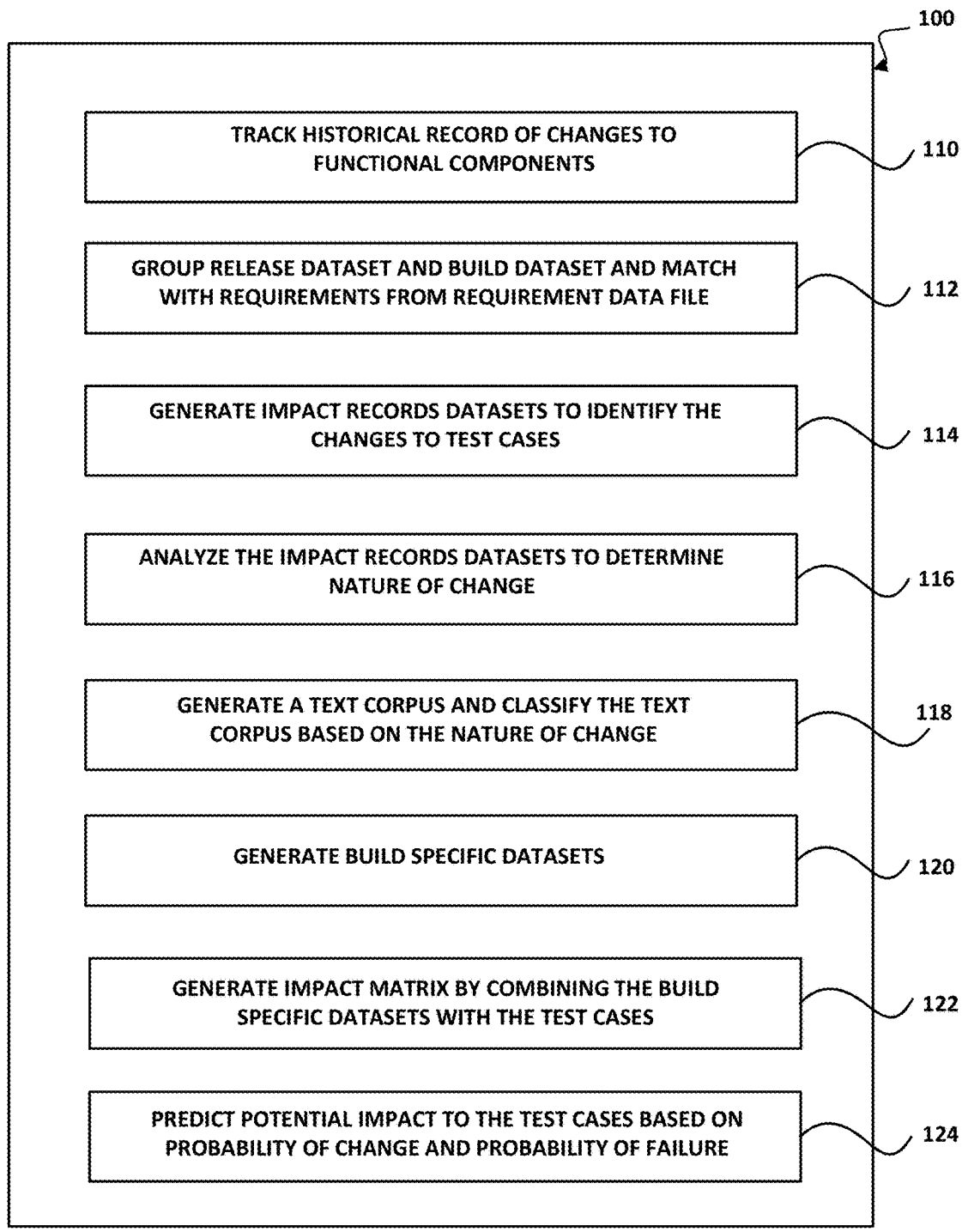
FIG. 1 shows a flowchart illustrating a method for dynamic impact analysis of changes to functional components of a computer application, as disclosed in an embodiment herein.

FIG. 1 shows a method 100 for dynamic impact analysis of changes to functional components of a computer application, according to an embodiment of the invention. The method comprising the step 110, tracking a historical record of the changes to the functional component; step 112, grouping a release dataset from a software configuration management (SCM) server and a build dataset from a continuous Integration (CI) server and matching with one or more requirement from a requirement data file; step 114, generating a plurality of impact records datasets by a data processor to identify the changes to test cases; step 116, analyzing the plurality of impact records datasets by the data processor to determine a nature of change to the one or more functional component; step 118, generating a text corpus 416 related to the changes and classifying the descriptions associated with the changes based on the nature of change; step 120, augmenting the plurality of impact records with the nature of change to generate a plurality of build specific datasets; step 122, generating an impact matrix 426 and an output matrix 428 based on the plurality of build specific datasets and step 124, predicting a potential impact to the test cases based on the impact matrix 426 and output matrix 428.

Figure 2:
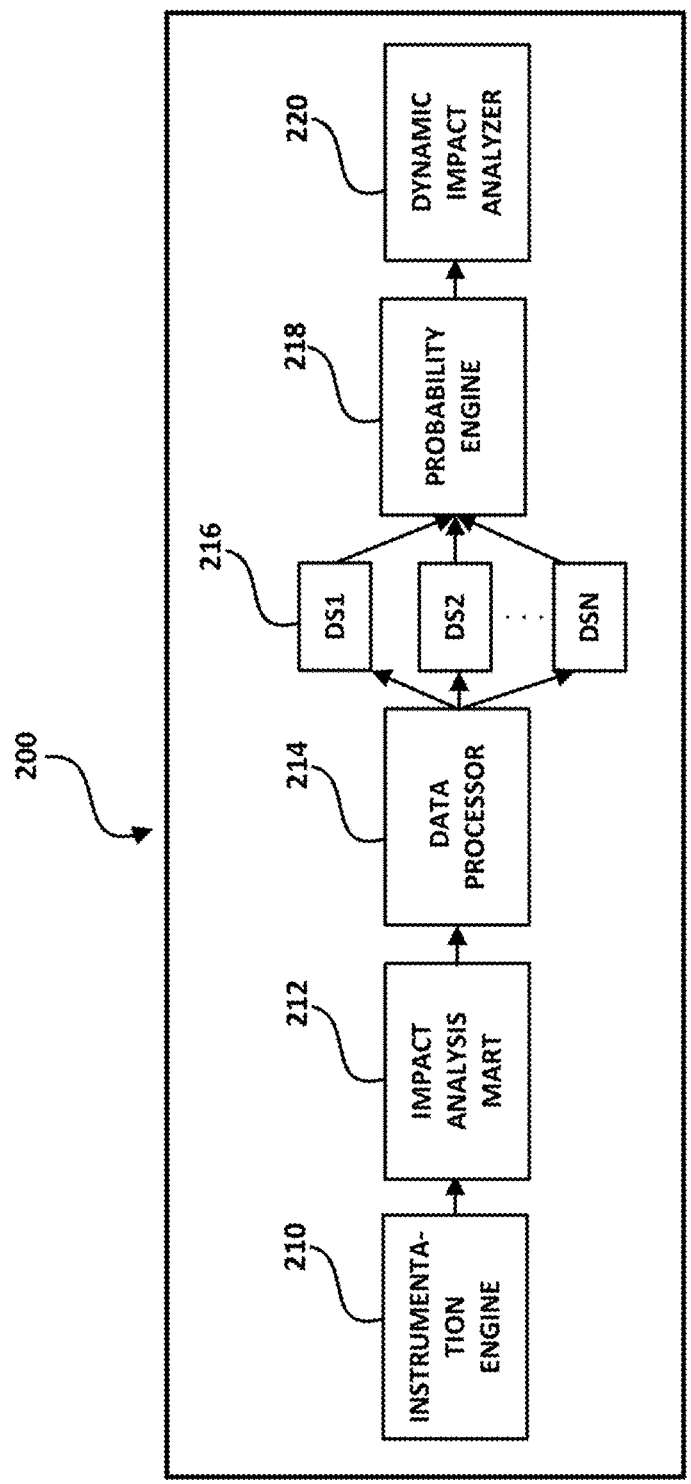
FIG. 2 shows a block diagram of a system for the dynamic impact analysis of the changes to the functional components of the computer application, as disclosed in the embodiment herein.

Referring to FIG. 2, shows a block diagram of a system 200 for dynamic impact analysis of changes to functional components, according to an embodiment herein. FIG. 2 shows an instrumentation engine 210 for tracking a historical record of the changes to the functional components and stores the historical changes in an impact analysis mart 212. The historical record of the changes may be received by a data processor 214 for grouping a release dataset from a software configuration management (SCM) server and a build dataset from a continuous Integration (CI) server and matching with a requirements from a requirements data file. The data processor 214 generates an impact records datasets to identify the changes to the test cases. The data processor 214 further analyzes the impact records datasets to determine a nature of change the functional components. The nature of change may be identified by the data processor 214 by generating a text corpus 416 related to the changes from the historical record. The text corpus 416 may be classified based on the description by a change classifier 420 to determine the nature of change. The data processor 214 augments the impact records with the nature of change to generate a plurality of build specific datasets 216. The data processor 214 further generates an impact matrix 426 by combining the build specific datasets 216 with the test cases related to the functional components and an outcomes of the test cases. A probability engine 218 processes the impact matrix 426 to generate an output matrix 428 comprising a probability of change and a probability of failure. A dynamic impact analyzer 220 predicts a potential impacts to the test case based on the impact matrix 426 and the output matrix 428.

Figure 3:
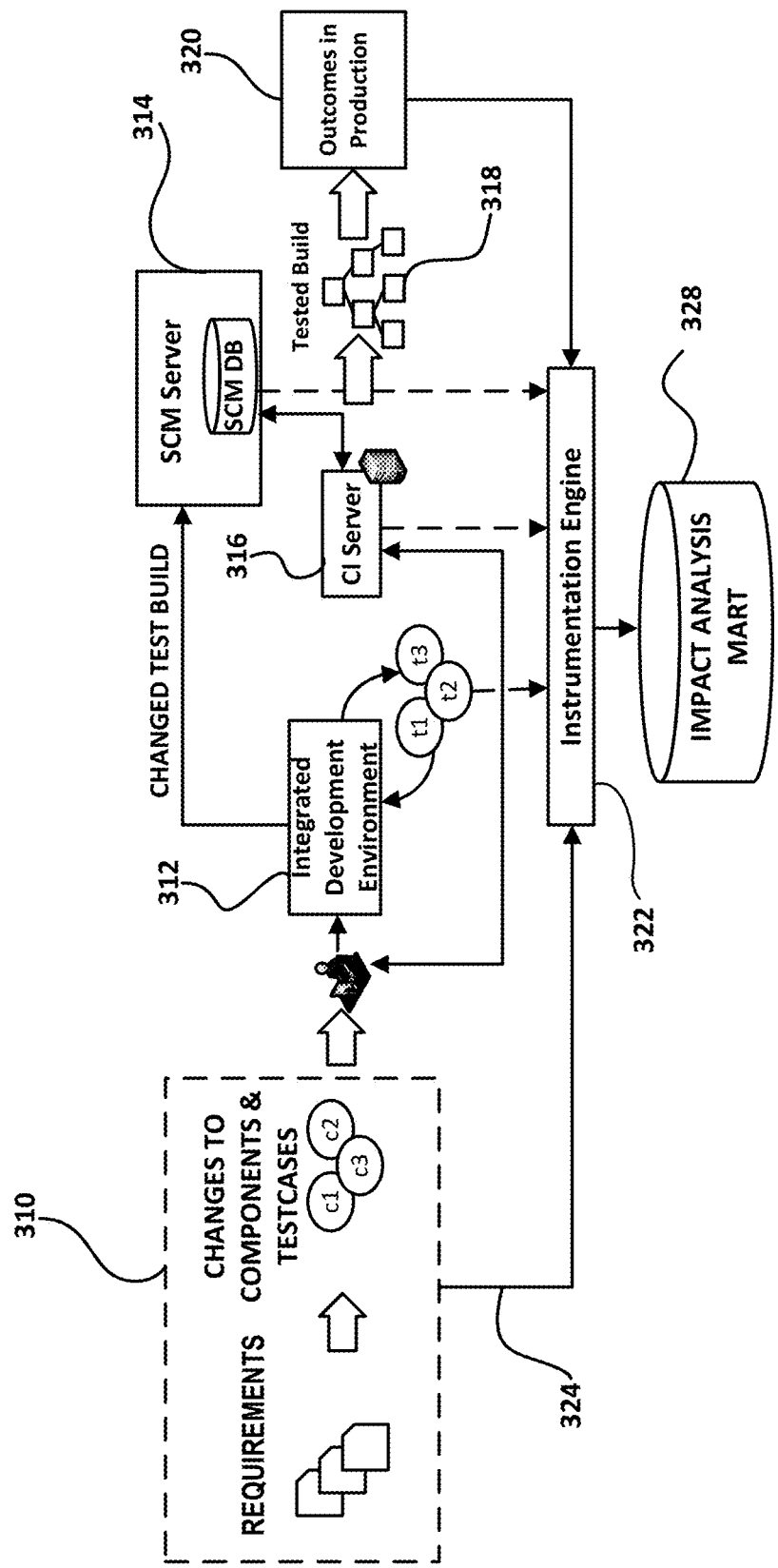
FIG. 3 shows a schematic diagram illustrating instrumentation of historical record of the changes in a software development cycle, as disclosed in the embodiment herein.

FIG. 3 shows a block diagram illustrating an extraction and storage of historical record of changes from various tools across a software development lifecycle, as disclosed in embodiment herein. In a typical software development cycle, block 310 shows a requirement data file, whenever there is a requirement for changes or changes to the functional components and the test cases, the software developer makes the changes to the functional components or the test cases in an integrated development environment (IDE) 312.

The changes may be saved in the software configuration management (SCM) server 314. The continuous integration server (CI) sever 316 tracks the changes in a build. The output of the CI server 316 may be a tested build 318, which goes in to the production. The outcomes 320 of the production indicates whether the build may be successful or failed. In a typical scenario, when there is the requirement for the change, the software developer changes the functional components. After changing the functional components, if the test case fails, then developer again changes the functional components or the test cases. If the changes are successful then the functional components goes in to production. The outcomes 320 of the changes may be tracked to determine the success or failure nature of the code.

According to embodiment, the instrumentation engine 322 may extract the historical record of the changes from one or more tools that may be a part of continuous integration and deployment pipeline (CICD pipeline). The one or more tools includes but not limited to Jenkins, Maven, Junit, Jira. The historical records tracked may be stored in an impact analysis mart 328.

The historical records may be comprising identifying one or more of requirements for the changes, one or more changes to functional components from SCM server 314, outcomes of Continuous Integration (CI) server 316, outcomes of runs of unit tests, integration test, systems tests and defects reported on the one or more one changes. The one or more requirements for the changes may include extracting textual description of the requirement and the changes to the components. Outcomes 320 may be comprising extracting textual descriptions of one or more incidents, tickets reported in production.

Figure 4A:
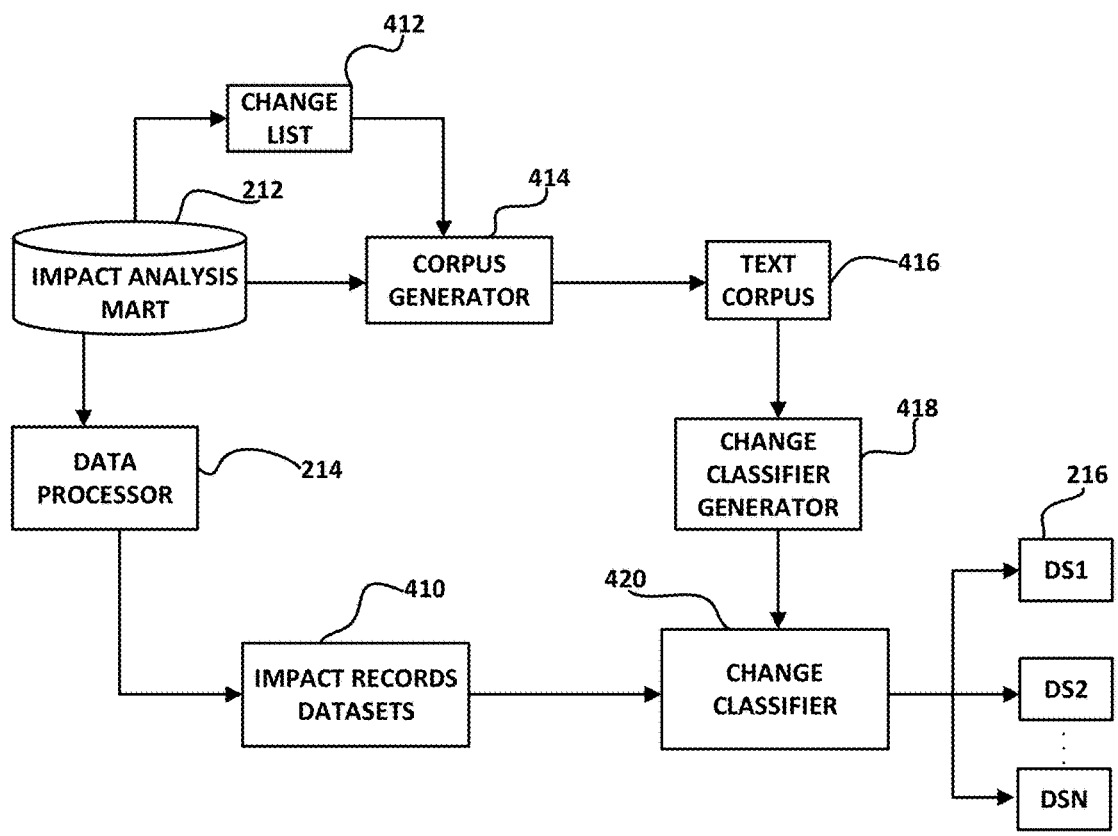
FIG. 4A illustrates a schematic diagram for generating a plurality of impact records datasets and a nature of change to a test cases by a data processor, according to the embodiment herein.
Figure 4B:
FIG. 4B shows a schematic diagram illustrating the plurality of impact records data sets, according to embodiment of the present invention.

FIG. 4A illustrates a schematic diagram to generate a plurality of impact records datasets 410 and a nature of change to test cases by the data processor 214, according to the embodiment herein. The historical records stored in the impact analysis mart 212 may be analyzed by the data processor 214 to generate the impact records datasets 410. Initially, the data processor 214 may group the build dataset gathered from the CI server 316 and the release dataset gathered from the SCM server 314. The grouping may be done by extracting the release tags indicating the changes to the functional components and the changes to the test cases from the SCM 314 server. The data processor 214 may identify the release tags corresponding to the build datasets from the CI server 316. The build datasets may be verified to check if there are any changes to the functional components or the test cases, if there are no changes then the build datasets may be excluded. The failed test case executions may be filtered based on the release datasets. The data extracted from the SCM server 314, the CI server 316 and the requirements data file 310 may be matched using a requirement tag or Identification (ID) (refer FIG. 4B) to generate the impact records data set 410. FIG. 4B shows an example table to illustrate the plurality of impact records datasets 410 extracted.

According to one or more embodiments, the changes in the requirements may be matched by tagging the requirement and mapping with the predefined requirements. The data files extracted from the SCM server 314 and the CI server 316 are searched using the tag. After searching the data files only the matching records indicating the changes in the SCM server 314 and the CI server 316 may be retained.

The changes in the SCM server 314 may be matched by extracting the changed components name and the change description associated with the functional components of the SCM server. The programming language of the functional components may be identified by extracting the file name. The extensions of the functional components may be extracted and matched with the list of configured extension files and the test cases may be identified based on the expression patterns. According to embodiment, the expression patterns may be extracted from the configuration file by passing the programming language of the component. The changes from the CI server 316 may be matched by extracting the test cases failed in the build and name of the test cases. The changes extracted by matching with the requirements data file, SCM server and CI server are combined to generate the impact records data sets 410, as shown in FIG. 4B.

Figure 4C:
FIG. 4C shows a schematic diagram illustrating the plurality of impact records data sets augmented with the nature of change, according to embodiment of the present invention.

After generating the impact records data set, the change classifier 420 may identify the nature of change. The change list 412 may be extracted from the Impact analysis mart 212 by a corpus generator 414. The corpus generator 414 determines a text corpus 416. The text corpus 416 may include the historical records of changes having a change class and the descriptions related to changes. The changes may be organized around a set of class. A change classifier generator 418 receives the text corpus 416 comprising the one or more documents and applies one or more document classification algorithm to classify the descriptions. The change classifier 420 uses the change descriptions from the impact records data set to identify nature of change. The change classifier 420 runs in a batch mode, iterating through the records from the impact records dataset and augments the one or more impact records data sets with the nature of change to generate build specific data sets 216, as shown in the FIG. 4C. The FIG. 4C shows an example table to illustrate how the plurality of impact records datasets 410 may be augmented with nature of change.

According to embodiment herein, the data processor 214 may generate the nature of change based on the description extracted related to the changes to functional components. The nature of change may be different based on the application. The nature of change may be identified by analyzing the history of changes and determining patterns specific to application or system.

The nature of change may be identified by tagging the historical record with the text corpus 416. The test corpus comprises the historical records having one or more one document. The one or more document includes a change class having the one or more description related to the changes to the functional components. The nature of change may be identified by the change classifier 420 by classifying the descriptions based the document classification algorithm.

The document classification algorithm comprising one or more of maximum entropy, machine learning, natural language processing, Naive Bayes classifier, neural networks, decision tree, Latent semantic indexing, Support vector machines (SVM), Artificial neural network, K-nearest neighbor algorithms, Concept Mining and Multiple-instance learning.

Figure 4D:
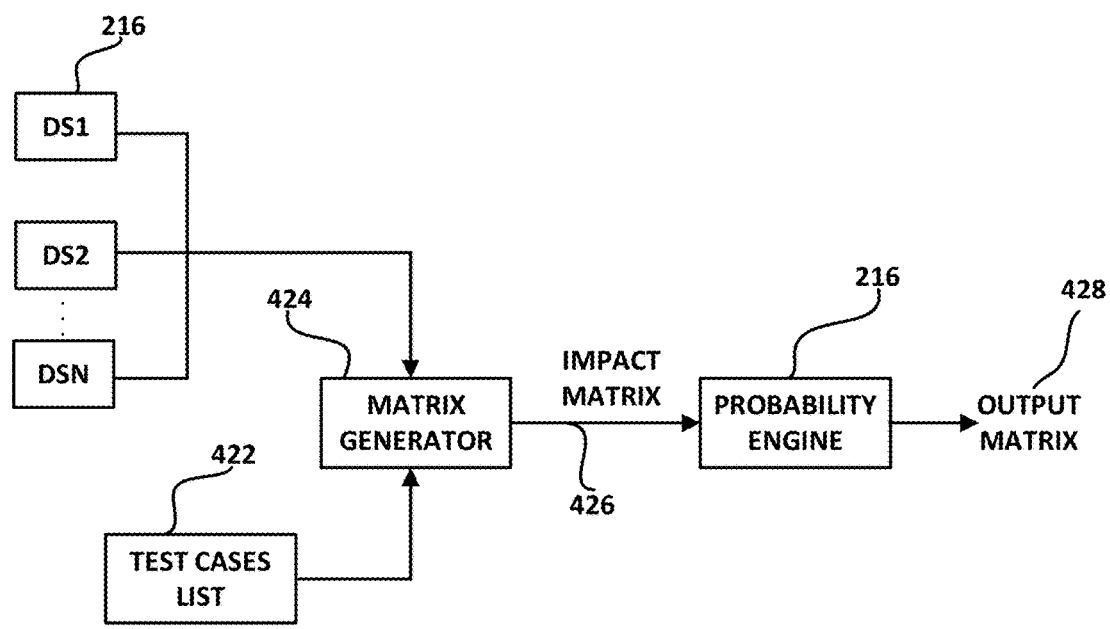
FIG. 4D shows schematic diagram illustrating a matrix generator and a probability engine, according to the embodiment herein.

FIG. 4D shows a schematic diagram illustrating a matrix generator and a probability engine, according to the embodiment herein. The plurality of impact records 410 may be augmented with the nature of change to generate a plurality of build specific datasets (DS1, DS2 etc.) 216. The plurality of build specific datasets 216 may be combined with the test cases 422 related to the functional components and outcomes the test cases to generate the impact matrix 426. The impact matrix 426 may be further processed to generate the output matrix 428 including a probability of change and a probability of failure.

According to an example embodiment, a method for generating an output matrix may be illustrated with an example as shown in below table. However, the below method may not be considered as limiting, those skilled in the art may use other manners to obtain the output matrix. The manners may be also encompassed within the scope of various embodiments of the invention.

Impact Matrix

| Functional Component | Nature of change | Build ID | Test case | Changed | Failed |
|---|---|---|---|---|---|
| ECR | Exception Management | 1 | T1 | Yes | Yes |
| ECR | Exception Management | 1 | T2 | No | No |
| ECR | Exception Management | 1 | T3 | No | No |
| ECR | Exception Management | 5 | T1 | No | Yes |
| ECR | Exception Management | 5 | T2 | No | No |
| ECR | Exception Management | 5 | T3 | Yes | Yes |
| ECR | UI | 7 | T1 | No | No |
| ECR | UI | 7 | T2 | No | Yes |
| ECR | UI | 7 | T3 | No | No |

Matrix Output

| Functional Component | Nature of Change | Probability(Nature of change) | Test Case | Probability of (Nature of Change\| Test case change) | Probability of (Nature of Change\| failure) |
|---|---|---|---|---|---|
| ECR | Exception Management | 0.66 | T1 | 0.5 | 1 |
| ECR | Exception Management | 0.66 | T2 | 0 | 0 |
| ECR | Exception Management | 0.66 | T3 | 0.5 | 0.5 |
| ECR | UI | 0.34 | T1 | 0 | 0 |
| ECR | UI | 0.34 | T2 | 0 | 1 |
| ECR | UI | 0.34 | T3 | 0 | 0 |

The generating output matrix 428 comprising:
Sorting the Impact Matrix 426 based on one or more nature of changes;
Determining the total number of builds ($U_T$) for the one or more one nature of change;
Sorting the matrix by one or more test cases for the one or more nature of changes;
Counting the number of failures ($U_F$) and changes ($U_C$) for one or more combination of one or more nature of changes and one or more test cases;
Calculating a probability of change by the operation ($U_C$)/($U_T$) for one or more combination of one or more nature of change types and test cases.
Calculating a probability of failure by the operation ($U_F$)/($U_T$) and
Creating a output matrix 428 comprising one or more of one or more nature of changes, one or more test cases, probability of the failure and probability of the change. The output matrix 428 from the probability engine may be indexed with a component name or ID to identify the impacts to test cases.

According to one or more embodiments, the plurality of impact records datasets 410 may include information related to one or more requirement Identification, the one or more description related to the one or more requirement, one or more functional component, one or more functional component change description, one or more nature of change, one or more build identification, one or more test case components and outcomes of the one or more test case.

According to the embodiment herein, the outcomes 320 may be comprising one or more of a success and a failure nature associated with the one or more test case. The changes comprises one or more of adding new functionality, fixing defects, architectural capabilities and technical capabilities to the computer application.

According to one or more embodiments, the nature of change comprises one or more of logic change, interface change, input change, output change, user interface change, database change, security, exception management and functional change.

Figure 5A:
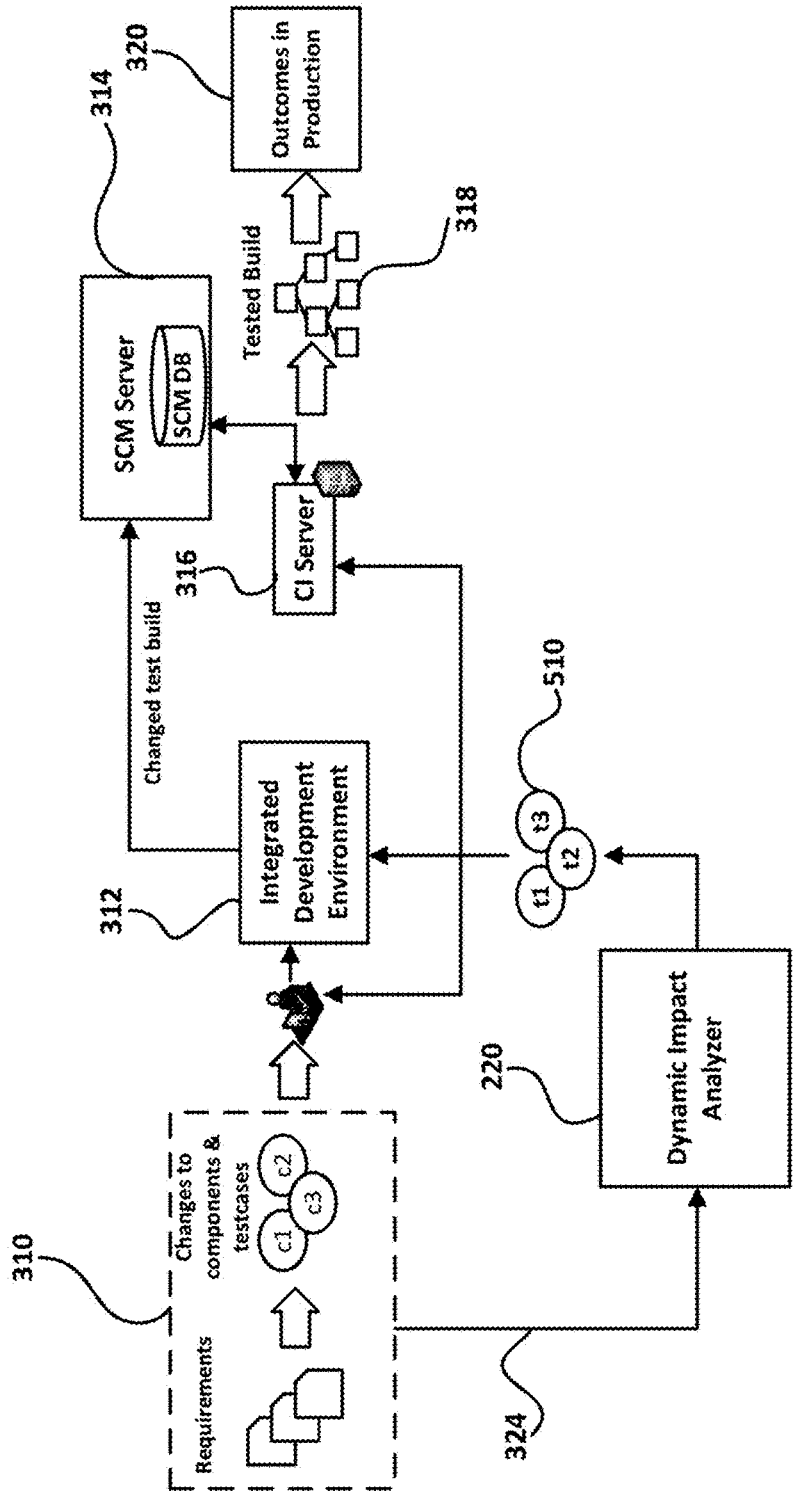
FIGS. 5A & 5B illustrate a block diagram for predicting an impacted test cases by a dynamic impact analyzer, as disclosed in embodiment herein.
Figure 5B:
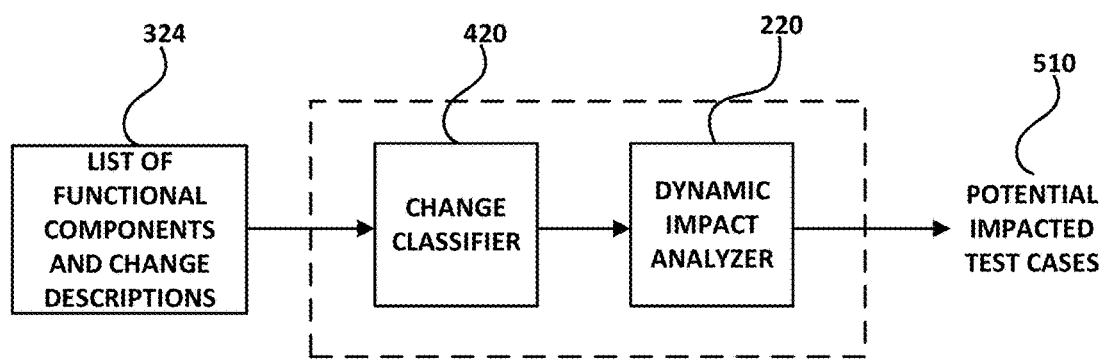

FIGS. 5A & 5B illustrate a block diagram for predicting an impacted test cases by a dynamic impact analyzer 220, as disclosed in embodiment herein. The dynamic impact analyzer 220 receives the changes to the functional component and provides the list of potential impacts to the test cases associated to the functional components. The dynamic impact analyzer processes the input list of functional components and the corresponding change description and determines the nature of change to the functional components. The nature of change to the functional components may be determined by the change classifier 420 of the data processor 214. The change classifier 420 receives the change description of the functional component and associates the nature of change the functional component. The dynamic impact analyzer determines the potential impacted test cases by grouping the list of changes to functional component and the nature of change. For each changes to the functional component, the impacted test cases may be identify from the output matrix of the probability engine. The impacted test cases may be identified based on the functional component and the corresponding value (from matrix output) of probability of change and probability of failure of the test case by using the following operations. Probability (Change|Nature of change)=(Probability (Nature of change|change)*Probability (change))/Probability (Nature of change).

Probability (Failure/Nature of Change)=(Probability (Nature of change|failure))*(Probability (change)/Probability (Nature of failure)

The method for predicting the potential impacts to the test cases may be illustrated with an example as shown in below table. However, the below method may not be considered as limiting, those skilled in the art may use other manners to predict the impact to test cases. These manners may be also encompassed within the scope of various embodiments of the invention.

| Impacted Test Cases | | | |
|---|---|---|---|
| Functional Component | Test Case | Probability Of Change | Probability Of Failure |
| ECR | T1 | 0.5 | 1.0 |
| ECR | T2 | 0 | 1.0 |
| ECR | T3 | 0.5 | 0.5 |

The dynamic impact analyzer determines the potential impacted test cases by grouping the list of changes to functional component and the nature of change. For each changes to the functional component, the impacted test cases may be identified from the output matrix of the probability engine. The impacted test cases may be identified based on the functional component and the corresponding value of probability of change and probability of failure of the test case. The potential impacts to the test cases may be calculated by grouping all the values of probability of change and probability of failure (values from output matrix) for the test cases and then applying the below logic:

If the values in the probability of change and probability of failure is 1.0 then the potential impacted value may be 1.

In case, there may be no test cases in the list with values 1.0 for the probability of change and the probability of failure then the values are computed using the logic:

If the values in the probability of change and probability of failure is 0 then the value is ignored.

The potential impacted to test cases is calculated by selecting the highest values for probability of change and probability of failure of the similar test cases in the list.

In an example embodiment, in the output matrix, for the test case T1 with the nature of change "exception Management", the value of probability of change is 0.5 and the probability of failure is 1.0. Similarly, for the test case T1 with the nature of change "user Interface" (UI) the probability of change is '0' and the probability of failure is '0'. Hence the final values to identify the potential impact may be calculated by selecting the highest value of probability of change and probability of failure of test case T1, hence the final values of probability of change is 0.5 and probability of failure is 1.0 for the test casts T1.

Having described and illustrated the principles of our invention with reference to described embodiments, it will be recognized that the described embodiments may be modified in arrangement and detail without departing from such principles.

While the present invention has been related in terms of the foregoing embodiments, those skilled in the art will recognize that the invention may not limited to the embodiments depicted. The present invention may be practiced with modification and alteration within the spirit and scope of the appended claims. Thus, the description is to be regarded as illustrative instead of restrictive on the present invention.

We claim:

1. A method for dynamic impact analysis of at least one change to at least one functional component of a computer application, the method comprising:

tracking a historical record of the at least one change to the at least one functional component;

grouping a release dataset from a software configuration management (SCM) server and a build dataset from a continuous Integration (CI) server and matching with at least one requirement from a requirement data file;

generating a plurality of impact records datasets by a data processor to identify the at least one change to at least one test case;

analyzing the plurality of impact records datasets by the data processor to determine at least one nature of change to the at least one functional component;

generating a text corpus related to the at least one change from the historical record;

receiving the text corpus by a change classifier to classify at least one description based on the at least one nature of change;

augmenting the plurality of impact records with the at least one nature of change to generate a plurality of build specific datasets;

generating at least one of an impact matrix and an output matrix based on the plurality of build specific datasets; and predicting a potential impact to the at least one test case by a dynamic impact analyzer based on the at least one of the impact matrix and the output matrix.

2. The method according to claim 1, wherein the creating of historical record comprises identifying at least one of requirements for the at least one change, tracking the at least one change to functional components, outcomes of continuous integration (CI) builds, outcomes of runs of unit tests, integration test, systems tests and defects reported on the at least one change.

3. The method according to claim 1, wherein the plurality of impact records datasets comprises information related to at least one of at least one requirement identification, the at least one description related to the at least one requirement, at least one functional component, at least one functional component change description, at least one nature of change, at least one build identification, at least one test case component and outcomes of the at least one test case.

4. The method according to claim 1, wherein the outcomes comprises at least one of a success or a failure details associated with the at least one test case.

5. The method according to claim 1, wherein the at least one change comprises at least one of adding new functionality, fixing defects, architectural capabilities or technical capabilities to the computer application.

6. The method according to claim 1, wherein the nature of change comprises one or more of logic change, interface change, input change, output change, user interface change, database change, security, exception management or functional change.

7. The method according to claim 1, wherein the generating the plurality of impact record datasets by the data processor comprises:

extracting at least one release tag indicating the at least one change to the at least one functional component and the at least one test case from the SCM server;

identifying the at least one release tag corresponding to the plurality of build data sets from the CI server;

filtering the at least one release dataset indicating at least one or more failed test case execution;

matching the data extracted from at least one of the SCM server, the CI server or the requirements data file to identify at least one change to the at least one test case.

8. The method according to claim 7, wherein the matching at least one change from the at least one requirement comprises:

tagging the at least one requirement by mapping with the requirement data file;
searching the data files extracted from the SCM server and the CI server using a tag; and
tracking only the matching records for the at least one change in the SCM server and the CI server.

9. The method according to claim 7, wherein the matching at least one change from the SCM server comprises:
extracting the at least one of a changed component name or the at least one change description associated with at least one component from the SCM server;
identifying at least one programing language of the at least one functional component by extracting a file name;
extracting an extension of the at least one component and matching the extension with a list of configured extension files; and
identifying if at least one component is a test case based on an expression pattern, wherein the expression patterns are extracted from the configuration file by passing the programming language of the component.

10. The method according to claim 7, wherein the matching at least one change from the CI server, comprises:
extracting at least one test case failed in the build; and
extracting a name of the build.

11. The method according to claim 1, wherein the at least one nature of change is identified by tagging the historical record with the text corpus.

12. The method according to claim 1, wherein the test corpus comprises the historical records having at least one document.

13. The method according to claim 12, wherein the at least one document includes a change class having the at least one description related to the at least one change to the at least one functional component.

14. The method according to claim 1, wherein the at least one nature of change is identified by the change classifier by classifying the at least one description based on at least one of a document classification algorithm.

15. The method according to claim 14, wherein the generating impact matrix by combining the plurality of build specific datasets with the at least one test case and the outcomes of the at least one test case.

16. The method according to claim 1, wherein the generating output matrix by calculating at least one of a probability of change or a probability of failure based on the impact matrix.

17. The method according to claim 1, wherein the predicting impacted test cases by the dynamic impact analyzer, comprises:
receiving at least one functional component and the corresponding at least one change description;
identify the at least one nature of change to the at least one functional component by the change classifier;
associating the at least one nature of change to the at least one functional component;
generating the output matrix for the at least one test case based on the impact matrix; and
displaying the potential impact to the at least one test case based on the output matrix.

18. A system for dynamic impact analysis of at least one change to at least one functional component of a computer application, the system comprising;
an instrumentation engine tracking a historical record of the at least one change to the at least one functional component and storing in an impact analysis mart;
a data processor configured to perform a method comprising:
grouping a release dataset from a software configuration management (SCM) server and a build dataset from a continuous Integration (CI) server and matching with at least one requirement from a requirement data file;
generating a plurality of impact records datasets by a data processor to identify the at least one change to at least one test case;
analyzing the plurality of impact records datasets by the data processor to determine at least one nature of change to at least one functional component;
generating a text corpus related to the at least one change from the historic record;
receiving the text corpus by a change classifier to classify at least one description based on the at least one nature of change;
augmenting the plurality of impact records datasets with the at least one nature of change to generate a plurality of build specific datasets; and
generating an impact matrix based on the plurality of build specific datasets and the at least one test case;
a probability engine configured to generate an output matrix based on the impact matrix; and
a dynamic impact analyzer configured to predict potential impacts to the at least one test case based on the at least one of the impact matrix and the output matrix.

19. The system according to claim 18, wherein the generating the plurality of impact records datasets by the data processor comprises:
extracting at least one release tag indicating the at least one change to the at least one functional component and the at least one test case from the SCM server;
identifying the at least one release tag corresponding to the plurality of build datasets from the CI server;
filtering the at least one release dataset indicating at least one or more failed test case execution; and
matching the data extracted from at least one of the SCM server, the CI server or the requirements data file to identify the at least one change to test case.

20. The system according to claim 19, wherein the matching at least one change from the at least one requirement comprises:
tagging the at least one requirement by mapping with the requirement data file;
searching the data files extracted from the SCM server and the CI server using a tag; and
tracking only the matching records for the at least one change in the SCM server and the CI Server.

21. The system according to claim 19, wherein the matching at least one change from the SCM server comprises:
extracting the at least one of a changed component name and the change description associated with at least one component from the SCM server;
identifying at least one programing language of the at least one functional component by extracting a file name;
extracting an extension of the at least one component and matching the extension with a list of configured extension files; and
identifying if at least one component is a test case based on an expression pattern, wherein the expression patterns are extracted from the configuration file by passing the programming language of the component.

22. The system according to claim 19, wherein the matching at least one change from the CI server comprises:
   extracting at least one test case failed in the build; and
   extracting a name of the build.

23. The system according to claim 18, wherein the predicting impacted test cases by the dynamic impact analyzer comprises:
   receiving at least one functional component and the corresponding change description;
   identify the at least one nature of change to the at least one functional component by the change classifier;
   associating the at least one nature of change to the at least one functional component;
   generating the output matrix for the at least one test case based on the impact matrix; and
   displaying the potential impacts to the at least one test case based on the output matrix.

* * * * *